US006496483B1

(12) United States Patent
Kung et al.

(10) Patent No.: US 6,496,483 B1
(45) Date of Patent: Dec. 17, 2002

(54) SECURE DETECTION OF AN INTERCEPTED TARGETED IP PHONE FROM MULTIPLE MONITORING LOCATIONS

(75) Inventors: Fen-Chung Kung, Bridgewater, NJ (US); Jesse Eugene Russell, Piscataway, NJ (US); Anish Sankalia, Iselin, NJ (US); Spencer C. Wang, Parsippany, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/376,459

(22) Filed: Aug. 18, 1999

(51) Int. Cl.[7] ............................. H04L 12/28; H04M 3/22
(52) U.S. Cl. ........................ 370/252; 370/392; 370/401; 379/32.01; 379/35
(58) Field of Search ................................. 370/389–390, 370/392, 352, 259–264, 401, 252, 465–469; 379/32.01, 35, 67.1, 70, 133, 88.01, 88.02, 88.19, 207.02, 219, 220.01

(56) References Cited

U.S. PATENT DOCUMENTS

| 6,115,393 | A | | 9/2000 | Engel et al. | |
|---|---|---|---|---|---|
| 6,122,357 | A | * | 9/2000 | Farris et al. | 379/207.02 |
| 6,229,887 | B1 | * | 5/2001 | Albers et al. | 379/207.02 |
| 6,233,123 | B1 | * | 5/2001 | Farris et al. | 379/112.01 |
| 6,289,025 | B1 | | 9/2001 | Pang et al. | |
| 6,324,279 | B1 | * | 11/2001 | Kalmanek, Jr. et al. | 370/410 |
| 6,351,453 | B1 | * | 2/2002 | Nolting et al. | 370/234 |

FOREIGN PATENT DOCUMENTS

WO        WO 97/41678        * 11/1997

* cited by examiner

Primary Examiner—Wellington Chin
Assistant Examiner—Maikhanh Tran
(74) Attorney, Agent, or Firm—Al Steinmetz

(57) ABSTRACT

Secure monitoring of a target IP telephone may be obtained simultaneously at a plurality of monitoring stations by requiring authentication to be provided by each of the monitoring stations prior to granting access permission to monitor the call. A single request generates multiple duplicate calls to a plurality of different monitoring location, each of which must be authenticated. When the monitored call arrives at each of the multiple monitoring stations a password is used to achieve authentication permission. The password is entered at each monitoring station by a touch-tone keypad that generates Dual Tone Multi-frequency (DTMF) signals (e.g., each signal is a combination of two tones at different frequencies) which is sent to an IP monitoring center, which grants surveillance permission.

8 Claims, 2 Drawing Sheets

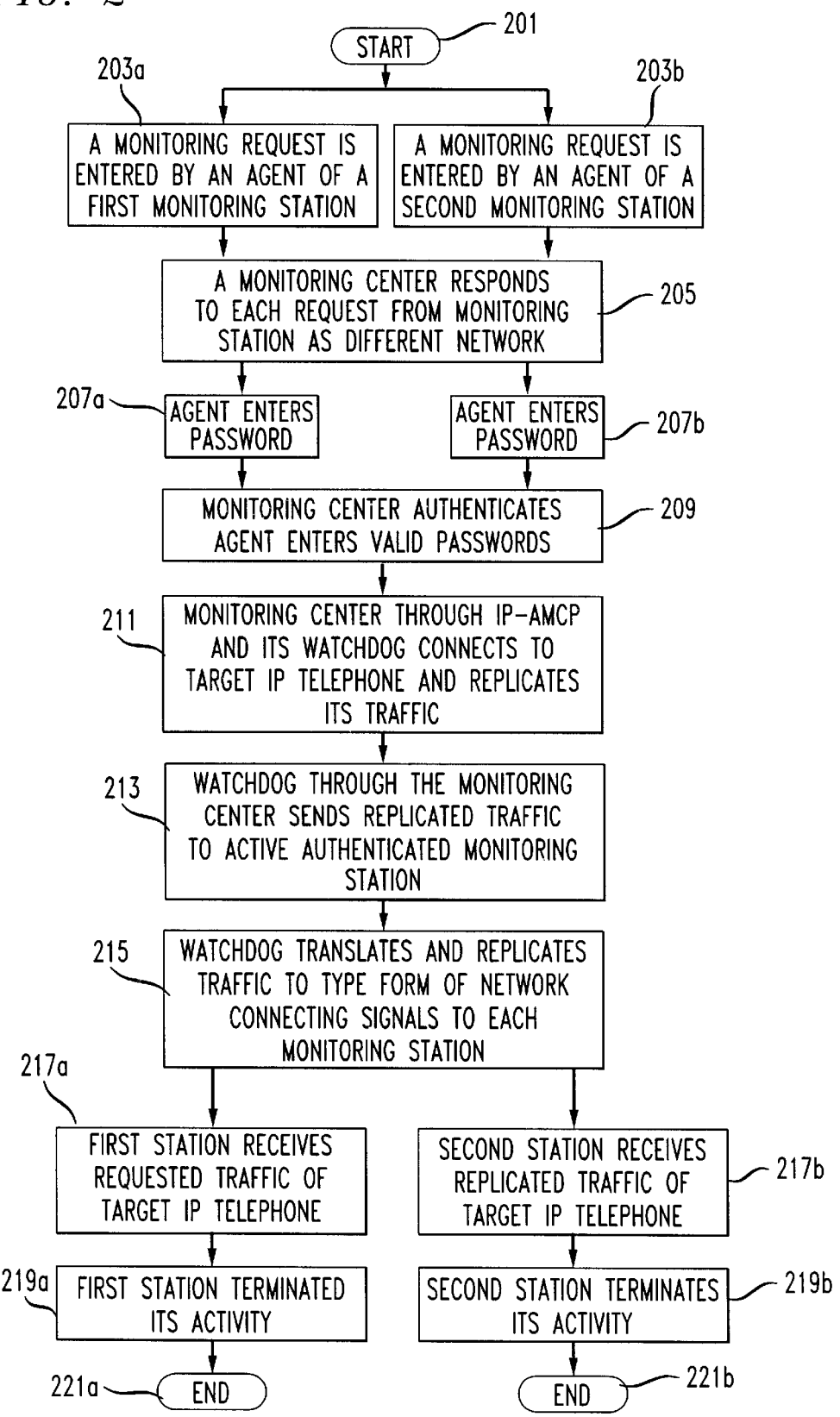

SECURE DETECTION OF AN INTERCEPTED TARGETED IP PHONE FROM MULTIPLE MONITORING LOCATIONS

FIELD OF THE INVENTION

This invention relates to surveillance of telephone calls over a public communications link and is particularly concerned with providing assistance for such surveillance to law enforcement agencies. It particularly concerns surveillance of voice over IP (i.e., cable) networks.

BACKGROUND OF THE INVENTION

Requirements for enabling surveillance of electronic communications have been enacted into public law (e.g., Public Law 103–414 enacted 10/25/94; CALEA Communications Assistance for Law Enforcement Act) reciting requirements for assuring law enforcement access to electronic communications. Such access is required to be in real time, have full time monitoring capabilities, simultaneous intercepts, and feature service descriptions. The requirements specifically include capacity requirements and function capability. It is incumbent upon communication carriers to provide such capability and capacity.

While initially limited in scope, at present, to certain communications technology it is almost assured that it will be extended to new technologies of communications.

With present technology monitoring is limited to one monitoring location which location is static. It would be desirable to permit monitoring of telephones by more than one monitoring location at the same time and to permit highly secure monitoring at each of such locations.

SUMMARY OF THE INVENTION

Secure monitoring of a target IP telephone may be obtained simultaneously at a plurality of monitoring stations by requiring authentication to be provided by each of the monitoring stations prior to granting access permission to monitor the call. A single request generates multiple duplicate calls to a plurality of different monitoring location, each of which must be authenticated. When the monitored call arrives at each of the multiple monitoring stations a password is used to achieve authentication permission. The password is entered at each monitoring station by a touch-tone keypad that generates Dual Tone Multi-frequency (DTMF) signals (e.g., each signal is a combination of two tones at different frequencies) which is sent to an IP monitoring center which grants surveillance intercept permission.

The monitored call is muted when the monitor receiver is initially engaged until the operator provides real time authentication. This avoids a pick up by some unauthorized listener.

A monitoring station may be connected to a Public Switched Telephone Network (PSTN) system and hence unable to directly monitor the target IP phone. Such a request is handled through a PSTN Check Point (PSTN-CP) which accepts the DTMF and forwards it to the IP monitoring center for validation. After pickup the PSTN-CP mutes the call until entry of a password granting access to avoid pick up by an unauthorized person.

DESCRIPTION OF THE DRAWING

FIG. 2 is a flow chart of the surveillance process performed in the surveillance system of FIG. 1.

DETAILED DESCRIPTION

Figure 1:
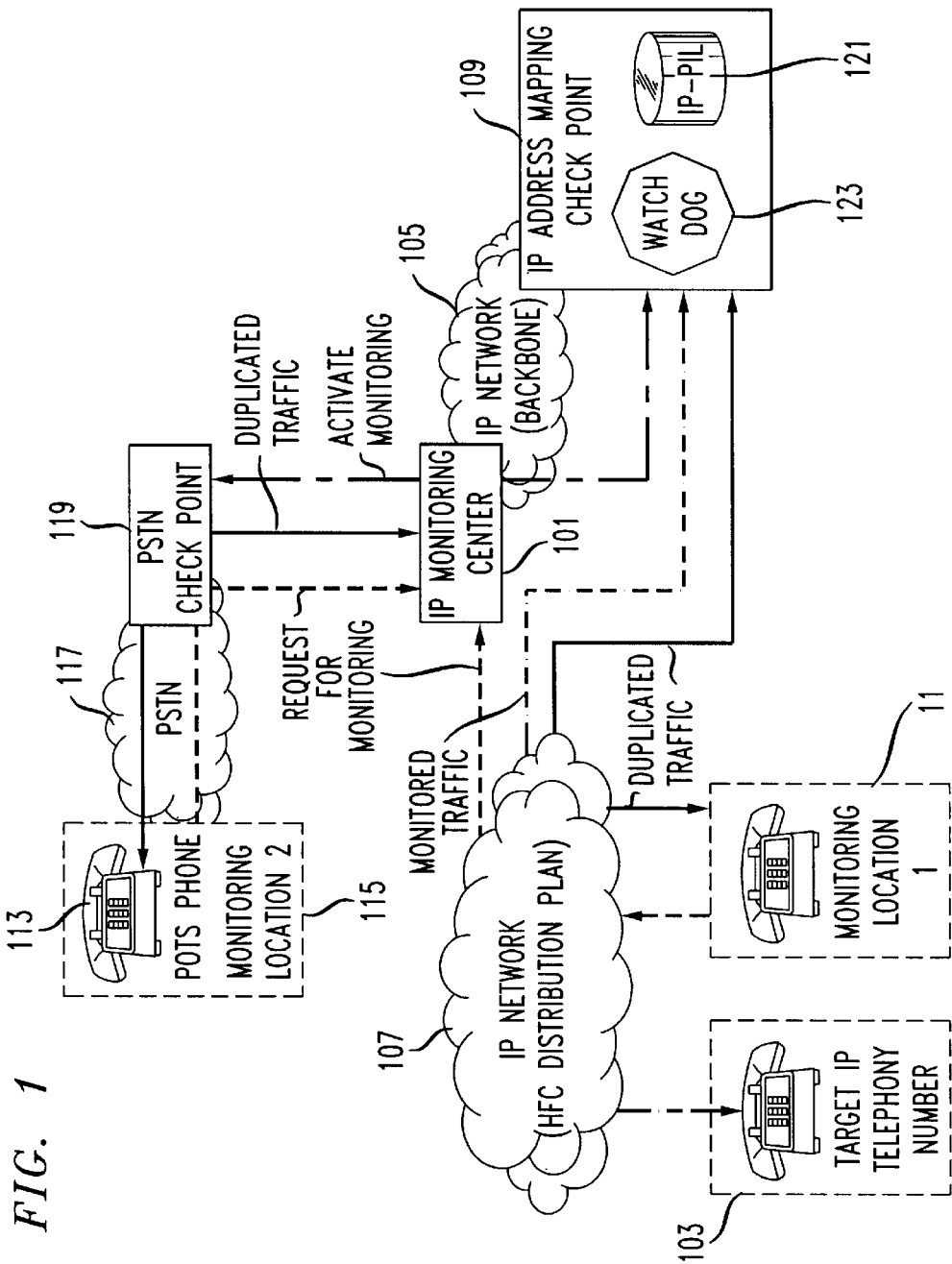
FIG. 1 is a block schematic of a surveillance system permitting secure surveillance at a plurality of monitoring stations.

A single surveillance request may result in an IP target telephone being monitored at a plurality of monitoring stations which may individually be located at varying different locations. Such a surveillance system is shown in the FIG. 1. Monitoring form different locations requires that each monitoring location be individually authenticated without impairing the monitoring functions of any other monitoring stations. Central to the system is an IP monitoring center 101 which is connected to various backbone networks to which monitoring stations and the target IP telephone 103 is connected. The IP monitoring center is connected to respond to monitoring requests from various monitoring stations connected to different networks and to enable the monitoring process.

A first monitoring station 111 is shown connected via an HFC distribution plant 107 to an IP network backbone 105 and to the IP monitoring center 101. HFC is a local distribution network that couples the fiber of a network to the cable of the termination station via an electro-optical connection. This permits broadband service provision to the termination station.

Associated with the IP backbone network 105 is an IP Address Mapping CheckPoint (IP-AMCP) 109, which is connected to be responsive to the IP monitoring center 101. The IP-AMCP may be embodied in a server within or connected to the network. It has the capability, through programming, of examining packet contents and authenticating users of the network. With specific WatchDog software the IP-AMCP identifies activity of specific designated telephone stations at a specified DN or IP address and can replicate/duplicate the packets of that phone which replicated/duplicated packets may be forwarded to a monitoring station.

The IP-AMCP also determines the type of voice signal to be transmitted to the terminal monitoring station of any network and includes a database of IP Phone Intercept List (IP-PIL) 121 which is a data base of current Directory numbers (DNs) of target telephones. It has the capability, through programming, of examining packet contents and authenticating users of the network. Also associated with IP-AMCP 109 is a WatchDog 123 which assists in detecting voice activity of one of designated target IP telephone stations replicates the traffic of the target IP telephone and assures proper packet format of the replicated traffic is suitable for transmission over the various networks to a monitoring station. With specific WatchDog software the IP-AMCP identifies activity of specific activity from designated telephone stations at a specified DN or IP address and can replicate/duplicate the packets of that phone which replicated/duplicated packets may be forwarded to a monitoring station.

A second monitoring station 113 is shown connected to a Local Digital Switch (LDS (e.g., 5ESS or DMS 100)) 115 which is connected to part of a PSTN network 117. A PSTN Check Point 119, for converting between packet and analog voice, is connected to the IP monitoring center 101. As shown the IP monitoring center may be part of the IP network backbone, but this is just illustrative. Various other connections are equally suitable.

Any monitoring station may direct a surveillance request to the IP monitoring center 101. In the instance of monitoring station 113 this request is transmitted via network 117.

For monitoring station 111 this request is by the network 109. The WatchDog 125 assures the proper connection and controls the return replicated massages to correlate to the network of the monitoring station.

The process of monitoring is delineated by the flow chart of FIG. 2. Initially the request for surveillance may be input from one or all of several stations such as shown in blocks 203a and 203b. The IP monitoring center responds to requests from all or part of the monitoring stations as per block 205. Access is granted, as per block 209, to requesting agents entering valid passwords in blocks 207a and 207b. The passwords may be entered as Dual Tone Multi-frequency (DTMF) signals by touchtone keypads associated with each monitoring station. The IP monitoring center interacts, as per block 211, with the IP network IP-AMCP and its WatchDog to establish a connection with the target IP telephone and replicates traffic. The WatchDog proceeds to direct the replicated traffic to the authenticated monitoring stations, as per block 213, and translates the replicated traffic to a format in harmony with the networks it passes on its way to a monitoring station as per block 215. If a monitoring station on the network is not authorized replicated calls are muted as to that station. The authorized monitoring stations receive the replicated traffic as per block 217a and 217b until the monitoring station terminates the connection as per blocks 219a and 219b at which point the stations reach their respective end terminal 221a and 221b.

The following applications are being filed concurrently with the present application and are incorporated herein by reference. All applications have the same inventors (e.g., Kung, Russell, Sankalia and Wang):

1999-0185 Monitoring Selected IP Voice Calls Through Activity of a WatchDog Program at an IP-Addressing Mapping Check Point;

1999-0186 Monitoring IP voice calls under command of a PSTN Phone;

1999-0187 Flexible Packet Technique for Monitoring Calls Spanning Different Backbone Networks;

1999-0188 Multiple Routing and Automatic network Detection of a Monitored Call from an Intercepted Targeted IP Phone to Multiple Monitoring Locations;

1999-0190 Automatic IP Directory Number Masking and Dynamic Packet Routing for IP Phone Surveillance;

1999-0229 IP Voice Call Surveillance through use of Non-dedicated IP Phone with Signal Alert Provided to Indicate Content of Incoming Call prior to an Answer as being a Monitored Call.

While exemplary systems and methods embodying the present inventions are shown by way of example, it will be understood, of course, that the invention is not limited to these embodiments. Modifications may be made by those skilled in the art which differ from the specific details disclosed here, but which are still within the scope of the invention. Further elements of one invention may be readily included as elements of one of the other inventions. Those skilled in the art may combine or distribute the elements in many different ways without departing from the spirit and scope of the invention.

What we claim is:

1. A method of secure surveillance of a target IP telephone from a plurality of monitoring stations; comprising the steps of:

initiating a request for surveillance of a target IP telephone from one of a plurality of surveillance stations each of which may be serviced by a network of different technology from those of other surveillance stations;

generating a plurality of duplicate calls to each of the plurality of monitoring stations in response to the initiating a request;

authenticating each of the monitoring stations seeking to join in the surveillance by entry of a password for each monitoring station;

muting the duplicate calls from any of the monitoring stations not having achieved authentication; and formatting intercepted messages of the monitored target IP phone for conforming to delivery over networks having a different technology than that of the target IP telephone by:

establishing a database of monitoring stations and a technology of their connecting networks at a central monitoring center associated with the IP network of the target IP telephone.

2. The method of claim 1, wherein the entry of a password includes a step of: generating a Dual Tone Multi-Frequency (DTMF) signal by means of a keyboard entry.

3. The method of claim 2 further including wherein a step of:

transmitting the DTMF signal to an IP monitoring center, which is operative to grant surveillance intercept permission.

4. A surveillance system for the monitoring of a target IP telephone from a plurality of monitoring stations, comprising:

a first and second monitoring station, each connected to at least one of a plurality of telephone networks;

a target IP telephone connected to a specific one of the plurality of telephone networks;

an IP Address Mapping Check Point (IP-AMCP) connected to service at least the specific one of the plurality of telephone networks by determining a voice signal type to be forwarded to each of the monitoring stations and further including a WatchDog function to identify activity of the target IP telephone; and an IP monitoring center connected to interconnect monitoring stations connected to a different network from the specific one of the plurality of telephone networks to the specific one of the plurality of telephone networks.

5. The surveillance system of claim 4, further comprising:

an IP Phone Intercept List (IP-PIL) included with the IP-AMCP for maintaining a database of target telephones to be monitored.

6. The surveillance system of claim 4, wherein the specific one of the plurality of telephone networks is an IP network.

7. The surveillance system of claim 6, wherein at least one of the at least one of a plurality of telephone networks is a PSTN system.

8. The surveillance system of claim 7, further including:

a PSTN Check Point (PCP) connected between the PSTN system and the IP monitoring center for translating between IP and PSTN signal formats.

* * * * *